July 25, 1939.   H. C. HASTINGS ET AL   2,167,481
ELECTRIC MOTOR CONTROL SYSTEM
Filed Dec. 28, 1938
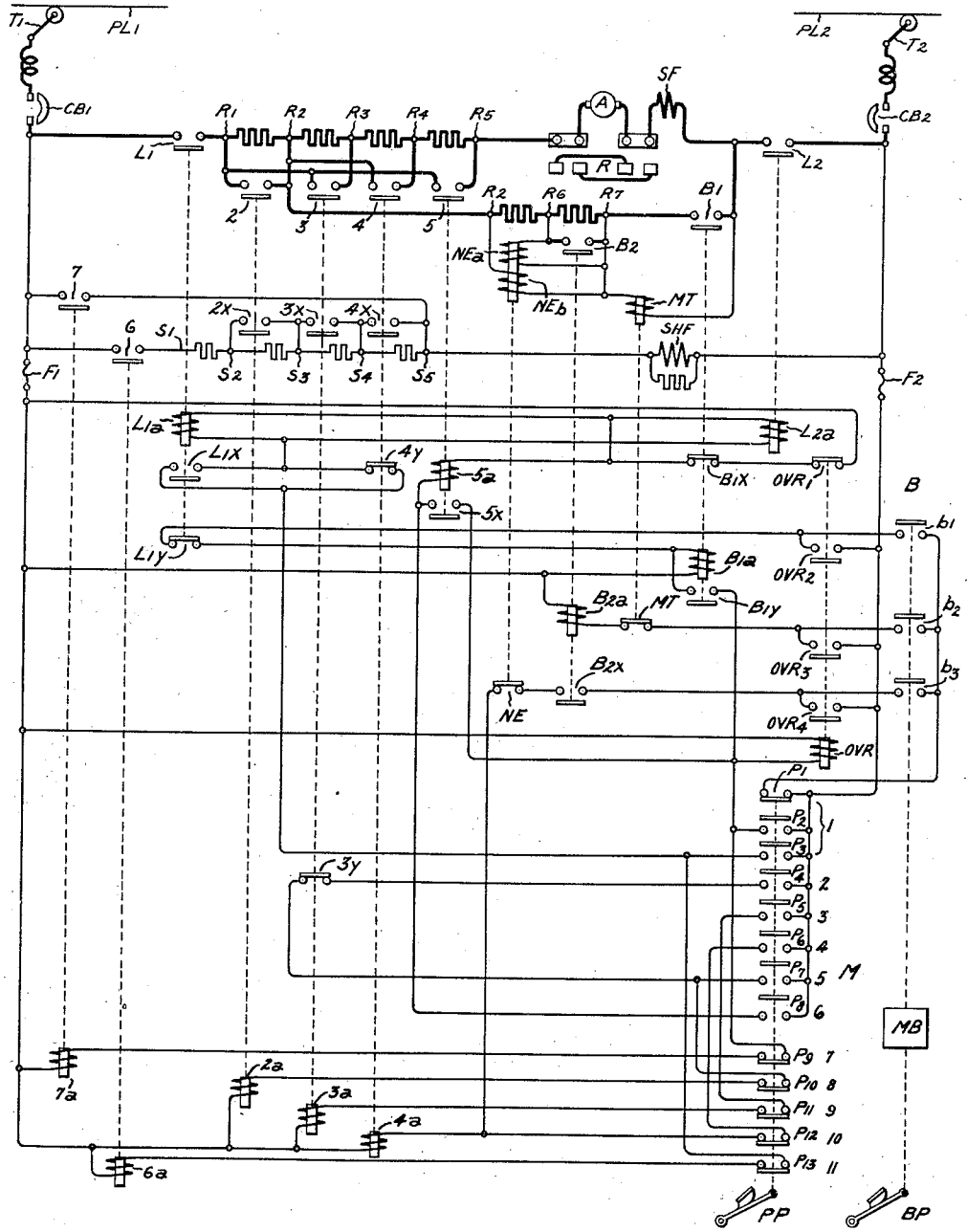
Inventors:
Hammond C. Hastings,
Frederick F. Usher,
by Harry E. Dunham
Their Attorney.

Patented July 25, 1939

2,167,481

UNITED STATES PATENT OFFICE 2,167,481

ELECTRIC MOTOR CONTROL SYSTEM

Hammond C. Hastings and Frederick F. Usher, Rugby, England, assignors to General Electric Company, a corporation of New York Application December 28, 1938, Serial No. 248,116
In Great Britain January 19, 1938

11 Claims. (Cl. 172—179)

This invention relates to control systems, more particularly to motor control systems of the kind which afford acceleration or speed regulation of the motor as well as braking control and which are adapted for use with electric traction motors and the like, and has for its object a flexible and reliable control system of this type.

In accordance with this invention, a particularly advantageous system of this kind is provided in which power acceleration and regenerative braking are obtainable with a master controller and in which rheostatic braking and mechanical braking are obtainable with a separate and independently operable controller. A further object of this invention is to provide certain combinations of control including regenerative and mechanical braking, rheostatic and mechanical braking, or regenerative, rheostatic or mechanical braking, respectively, alone.

Particularly in the operation of trolley buses, it is desirable that the bus driver should be able to apply his air brakes to check the motion of the vehicle while the power controller is being operated and regenerative braking is being obtained, as for example, when starting on a down grade, when it is necessary to apply power to start the bus and then to check down to a desired speed from time to time by a slight application of the mechanical brakes. It is also desirable that the operator should be able to save wear on the mechanical brakes by using rheostatic braking when the speeds are too low to obtain regenerative braking. Also, in order to prevent excessive rheostatic braking current being generated, if rheostatic braking is applied at high speed, it is desirable that the degree of rheostatic braking should be under the control of the operator to some extent; while for a quick application in case of emergency when he desires to apply a strong air braking as well, the rheostatic braking should be automatically limited to currents which will not cause damage to the electrical equipment.

In carrying this invention into effect, a master power controller is provided, operated by a pedal termed a "power pedal" through which the motoring and regenerative braking circuits are controlled, and a second controller is provided for controlling the rheostatic braking and the mechanical braking having another pedal termed a "braking pedal". This braking pedal is mechanically independent of the power pedal and has mechanically associated with it a sequencing contactor for controlling the rheostatic braking circuit, the operation being such that the first portion of the travel of the braking pedal causes the rheostatic braking circuit to be made, if the power pedal is in its off position.

Further movement of the brake pedal increases the degree of braking for any particular speed of the motor, and the final movement causes the air brakes or direct mechanical brakes to be applied. In this connection, it may be well to understand that the term "mechanical braking", as used in this specification, is intended to mean either directly operated brakes or brakes controlled by air, vacuum, fluid and the like. There is, of course, the usual separate hand operated brake on the vehicle, but this is not meant to be included in the general description of mechanical braking.

It is sometimes desirable to cause the rheostatic and mechanical braking control points on the brake pedal to overlap, and this can be effected to any desired degree by relative adjustment of the braking control contacts and the mechanical braking means.

For a more complete understanding of this invention, reference may be had to the accompanying drawing which comprises a circuit diagram of a motor and motor control system illustrating one embodiment of the invention.

Referring to the drawing, the motor circuit is supplied with power from a pair of direct current power lines PL1 and PL2 through suitable trolley conductors T1 and T2 having the circuit breakers CB1 and CB2, respectively, for breaking the supply connections at either side adjacent the power lines PL1 and PL2. Connected in series between the circuit breakers CB1 and CB2 are a line contactor L1, a plurality of resistance sections comprising four resistances R1 R2 to R4 R5, a motor armature A, a series field winding SF, and a line contactor L2. A suitable reversing switch R for reversing the motor is conveniently illustrated below the armature A. Four contactors 2, 3, 4 and 5 are connected in shunt across various resistance sections R1 R2 to R4 R5 for short circuiting all or a portion of the resistance sections to accelerate the motor. In addition to the accelerating resistance sections, a further pair of resistance sections R2 R6 and R6 R7 may be connected in shunt across the motor armature A and series field winding SF for purposes of rheostatic braking. This portion of the rheostatic braking circuit runs from the midpoint R2 between resistance sections R1 R2 and R2 R3 through the resistance sections R2 R6, R6 R7, a braking contactor B1 to a midpoint between the series field winding SF and the line contactor L2. Connected in shunt across a portion of the motor circuit from a midpoint between the circuit breaker CB1 and line contactor L1 to the midpoint between the circuit breaker CB2 and the line contactor L2 is a shunt field winding SHF having in series therewith the four resistance sections S1 S2 to S4 S5 and a contactor 6. A further group of four contactors 7, 2x, 3x and 4x are provided with their connections for short circuiting all or any portion of the resistance sections S1 S2 to S4 S5 in the shunt field winding circuit.

Besides the main circuits and connections hereinabove described, a group of control circuits is provided as illustrated in the drawing whose arrangement will present no difficulty to those skilled in the art and it is, therefore, deemed unnecessary herein to describe these control circuits. The various control functions to be described hereinafter are achieved by two separate actuating means which comprise a main controller M for acceleration and regenerative braking and a braking controller B for mechanical and rheostatic braking. The controllers M and B may be of any suitable form, and may for example be drum controllers. For purpose of simplicity the master or power controller M is illustrated as a sequentially operating contactor having 13 pairs of contact points P1 to P13, respectively, provided with bridging contacts operated in order from an "off" position through the control points 1 to 11 by means of a master power pedal PP. The operation of the master controller M is such that movement of the power pedal PP from the "off" position to control position 1 opens the normally closed contacts P1 and simultaneously closes the normally open contacts P2 and P3. Thereafter, further downward movement of the power pedal through the control positions 2—6 closes in order the normally open contacts P4 to P8 and finally, movement through the control positions 7—10 to the extreme position 11 opens in order the normally closed contacts P9 to P13, each of the contacts P1 to P13 being retained in its operated position while the power pedal PP is depressed and being returned to the normal position in inverse numerical order through the control positions 11—1 to the "off" position as the power pedal moves upwardly when released.

The brake controller B is disclosed as provided with the normally open contacts b1, b2, and b3 arranged to be closed in sequential numerical order by downward movement of a brake pedal BP. The brake pedal BP is also arranged to control the application of mechanical braking means MB to an increasing extent as it is depressed. The mechanical braking means MB may be of any suitable type as hereinbefore explained which operates on the wheels of the vehicle or directly on the motor shaft. Upward movement upon release of the brake pedal BP gradually reduces the application of mechanical braking and opens the contacts b3, b2 and b1 sequentially in this order. The master controller M and the brake controller B operate in a similar manner and may be replaced by suitable drum switches or the like providing a similar operation.

As hereinbefore explained, the control points on the brake controller B may be adjusted so that first, rheostatic braking is applied and then combined rheostatic and mechanical braking; or there may be an overlapping of the two so that first, weak rheostatic braking is applied, then stronger rheostatic braking and mechanical braking and so on, or a combination of rheostatic and mechanical braking immediately upon actuation of the brake pedal BP. It should be understood, however, that rheostatic braking can not be obtained unless the master controller M is in the "off" position, i. e., with the contacts P1 closed, although mechanical braking may be obtained at any time. The controllers M and B are electrically interrelated through the contacts P1 so that normally rheostatic braking cannot be obtained unless the contacts P1 are closed, except on overvoltage conditions across the motor as will be explained hereinafter. Preferably, the connection between the brake controller B and the mechanical braking means MB actuated by the brake pedal BP is such that the first movement of the pedal applies rheostatic braking and further movement increases the degree of rheostatic braking and applies the mechanical brakes.

In order to prevent too severe an application of the rheostatic braking should the brake pedal be suddenly depressed while the vehicle is travelling at speed, a relay MT is provided in the control circuit which gives a time delay between the first and second stages of rheostatic braking and a further relay NE prevents the final stage of rheostatic braking being applied until the current in the braking circuit has fallen to a predetermined value.

In operation the circuit breakers CB1 and CB2 are closed and the reversing switch R is put into the forward position. The power pedal PP is then depressed causing contacts P1–P13 of master controller M to operate in sequence. The opening of "off position" contacts P1 renders electrical braking on the brake pedal BP inoperative. On the first point of the controller M contacts P2 and P3 close simultaneously establishing circuits from trolley arm T1 through circuit breaker CB1, fuse F1, overvoltage relay contacts OVR1, auxiliary contacts B1x of contactor B1, coils L1a and L2a of contactors L1 and L2 in parallel, auxiliary contacts 4y of contactor 4, contacts P3 of controller M, fuse F2 and circuit breaker CB2 to trolley arm T2. Contactors L1 and L2 accordingly close and connect the motor armature A and series field SF across the supply with all series resistance R1—R5 in circuit. At the same time coil 6a of contactor 6 is energized from the supply by a circuit established through contact P13 and P3 of controller M while coil 7a of contactor 7 is energized through contacts P9 and P2 of controller M. Contactors 6 and 7 therefore close and connect the shunt field winding SHF of the motor across the supply with all series resistance S1—S5 short circuited.

The closing of contact P4 in the second control position energizes coil 2a of contactor 2 which closes to short circuit section R1 R2 of resistance R1—R5 and accelerate the motor. Similarly, the closing of contacts P5 in the third control position effects closure of contactor 3, which short circuits the sections of resistance R1—R3 accelerating the motor a further step. At the same time the auxiliary contacts 3y of contactor 3 open and de-energize coil 2a, thus opening contactor 2. The closing of contacts P6—P8 in control positions 4—6 effects the closure in sequence of contactors 4, 2 and 5, the latter short circuiting the whole of the series resistance R1—R5. The circuit of coil 5a of contactor 5 is retained through auxiliary contact 5x of contactor 5 through contacts P2 of the controller M, contactor 5 thereby continuing to short circuit the resistance R1—R5.

The opening of contacts P9 in control position 7 of controller M de-energizes coil 7a of contactor 7 which opens and inserts resistance section S1 S2 in the shunt field circuit of the motor. The opening of contacts P10—P12 in control positions 8—10 de-energizes coils 2a, 3a and 4a of contactors 2, 3 and 4 which consequently open in sequence and through their auxiliary contacts 2x, 3x and 4x progressively insert further sections of resistance S1—S5 in the shunt field circuit. Finally opening of contact P13 in the extreme control position 11 of the controller M de-energizes coil 6a of contactor 6 which opens to interrupt the circuit of the shunt field winding and accelerates the motor to full speed.

For normal regenerative braking the master controller M is returned toward the "off" position from the control position 11 to the positions 10—1, so that the shunt field winding SHF is re-energized and the resistance S1—S5 short circuited in steps to strengthen the shunt field. Series resistance R1—R5 is not re-inserted, unless and until the controller M reaches its "off" position because auxiliary contact 5x maintains a holding circuit for contactor 5.

If it is found that regenerative braking alone does not produce sufficient retarding force, the brake pedal may be depressed to apply the mechanical brakes and thus check the vehicle speed while allowing regeneration to continue.

If it is desired to allow the vehicle to coast without power on, then the master controller M is released quickly to the "off" position and the contactors open before any braking effect is produced.

If now the brake pedal is depressed, the initial movement causes contacts b1 of braking controller B to close and coil B1a of contactor B1 is energized through auxiliary contacts L1y of contactor L1, contacts b1 of braking controller B and contacts P1 of master controller M. Contactor B1 accordingly closes connecting resistance sections R2 R6 and R6 R7 across the armature and series field, contactors L1 and L2 being open. At the same time a circuit is established from trolley arm T1, through coils 7a of contactor 7, contacts P9 of controller M, auxiliary contacts B1y of contactor B1, auxiliary contacts L1y of contactor L1, contacts b1 of controller B, and contacts P1 of controller M to trolley arm T2. Contactor 7 accordingly closes to connect the shunt field winding SHF directly across the supply. The first stage of rheostatic braking is thus established.

Prior to contactor B1 closing, the contacts of relay MT are held open by its coil which is connected across contactor B1. The closing of contactor B1 short circuits the coil of relay MT which then closes its contacts after a short time delay, and provided the brake pedal has been depressed sufficiently to cause contacts b2 of braking controller B to make contact, then contactor coil B2a is energized causing contactor B2 to close and produce the second stage of rheostatic braking by short circuiting resistance section R6 R7.

Prior to the closing of contactor B2, the contacts of relay NE are held open by its coils NEa connected across resistance section R6 R7 and NEb connected across resistance sections R2—R7. The closing of contactor B2 short circuits the coil NEa and provided the rheostatic braking current has dropped to a value such that the voltage drop across resistance section R2 R6 is below a predetermined value, the contacts of relay NE will close. Provided the brake pedal has been depressed sufficiently to cause contacts b3 of the brake controller B to make contact, then coil 4a of contactor 4 will be energized through the contacts of relay NE, auxiliary contacts B2x of contactor B2 and contacts b3 and P1 of controllers B and M, respectively. Contactor 4 will thus close and produce full rheostatic braking by short circuiting resistance sections R2—R4.

Should the voltage rise to an excessive value while regenerating, i. e., when the controller M is in an "on" position, the overvoltage relay OVR will operate and contacts OVR1 will interrupt the circuits of coils L1a and L2a thus opening line contactors L1 and L2. Coil B1a of contactor B1 will now be energized through auxiliary contacts L1y of contactor L1 and contacts OVR2 of the overvoltage relay. Contactor B1 accordingly closes to produce the first stage of rheostatic braking, and by means of circuits established through contacts OVR3 and OVR4 of the overvoltage relay, the degree of braking is automatically increased to maximum as described above. It will be noted that under these conditions contactor B1 is retained through its auxiliary contact B1y and contact P2 of master controller M until this controller is brought back to the "off" position.

This arrangement allows regenerative braking to be applied smoothly and maintained easily under the control of the power pedal only, while additional braking can be obtained by the mechanical brakes to supplement regenerative braking if required. It allows the maximum use of regeneration for power saving since regeneration can be maintained down to the lowest regenerating speed independently of relay setting or brake pedal position.

When making service stops with the power pedal released to the "off" position, rheostatic braking is always applied to assist the mechanical brakes.

As the changeover from regenerative to rheostatic braking is not automatic, no uncertainty can exist in the mind of the driver as to the control which he exerts over the vehicle.

The absence of automatic reclosing or changeover relays gives the scheme the advantage of simplicity.

Under no circumstances can power be applied by the brake pedal, nor can regenerative braking be obtained.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

What we claim as new and desire to secure by Letters Patent of the United States is:

1. A system of control for an electrically propelled vehicle comprising electric motor acceleration, regenerative braking and rheostatic braking means, a master controller for said means for controlling the acceleration and regenerative braking of said vehicle, a mechanical brake for said vehicle, another controller for said means for effecting rheostatic braking and for applying said mechanical brake, and means electrically interrelating said controllers whereby when said master controller is moved to effect regenerative braking, movement of said other controller effects mechanical braking only of said vehicle, and when said master controller is in a predetermined position movement of said other controller effects combined mechanical and rheostatic braking of said vehicle.

2. A system of control for an electrically propelled vehicle comprising electric motor acceleration, regenerative braking and rheostatic braking means, a master controller for said means for controlling the acceleration and regenerative braking of said vehicle, a mechanical brake for said vehicle, another controller for said means for effecting rheostatic braking and for applying said mechanical brake, and means electrically interrelating said controllers whereby when said master controller is moved to effect regenerative braking, movement of said other controller effects mechanical braking only of said vehicle, and when said master controller is in a predetermined position movement of said other controller effects alternatively rheostatic braking and combined mechanical and rheostatic braking of said vehicle.

3. A system of control having an electric motor comprising electric motor acceleration, regenerative braking and rheostatic braking means, a master controller for said means by which the speed of the motor is subject to voluntary acceleration and regenerative braking, a mechanical brake for said motor, a separate and independently operable brake controller for said means for effecting rheostatic braking and for applying said mechanical brake, and means electrically interrelating said controllers whereby when said master controller is moved to effect regenerative braking, movement of said other controller effects mechanical braking only on said motor, and when said master controller is in a predetermined position movement of said brake controller effects combined mechanical and rheostatic braking of said motor.

4. A system of control having an electric motor comprising electric motor acceleration, regenerative braking and rheostatic braking means, a master controller for said means by which the speed of the motor is subject to voluntary acceleration and regenerative braking, a mechanical brake for said motor, a separate and independently operable brake controller for said means for effecting rheostatic braking and for applying said mechanical brake, and means electrically interrelating said controllers whereby when said master controller is moved to effect regenerative braking, movement of said other controller effects mechanical braking only of said motor, and when said master controller is in a predetermined position movement of said brake control effects alternatively rheostatic braking and combined rheostatic and mechanical braking of said motor.

5. A system of control for an electric motor comprising acceleration, regenerative braking and rheostatic braking means, a master controller for said means by which the speed of the motor is subjected to voluntary acceleration control and regenerative braking in a plurality of "on" positions of said master controller, a mechanical brake for said motor, and a separate pedal-operated brake controller for applying mechanical braking when the master controller is in an "on" position and for applying rheostatic and mechanical braking when said master controller is in the "off" position, a pedal for said braking controller, said pedal-operated brake controller initially providing rheostatic braking in the first part of the travel of said pedal and rheostatic and mechanical braking during the subsequent part of its travel.

6. In a motor control system electric motor acceleration and regenerative braking means, a master controller for said means for providing power acceleration and regenerative braking control of a motor, a second controller separately operable to provide rheostatic braking of said motor including a plurality of resistance sections, a braking contactor for controlling the connection of said resistance sections in circuit with said motor, means for controlling the subsequent shorting out of portions of said resistance sections from the circuit of said motor for increasing the rheostatic braking as the electric current through the motor circuit is reduced to a safe value, and means electrically interrelating said controllers whereby when said master controller is in a predetermined position, operation of said second controller normally effects rheostatic braking of said motor.

7. In a motor control system electric motor acceleration and regenerative braking means, a master controller for said means for providing power acceleration and regenerative braking control of a motor, a second controller for said motor separately operable to provide rheostatic braking including a plurality of resistance sections, a braking contactor for controlling the connection of said resistance sections in circuit with a motor, and means including a relay having a coil connected across said braking contactor and short circuited by the closing of said braking contactor to control the subsequent shorting out of a portion of said resistance sections from the circuit of said motor, and means electrically interrelating said controllers whereby when said master controller is in a predetermined position, operation of said second controller normally effects rheostatic braking of said motor.

8. In a motor control system electric motor acceleration and regenerative braking means, a master controller for said means for providing power acceleration and regenerative braking control of a motor, a second controller for said motor separately operable to provide rheostatic braking when said master controller is in a predetermined position including a plurality of resistance sections, a braking contactor for controlling the connection of said resistance sections in circuit with said motor, means including a relay having a coil connected across said braking contactor and short circuited by the closing of said braking contactor to control the subsequent shorting out of a portion of said resistance sections from the circuit of the motor, means electrically interrelating said controllers whereby when said master controller is in a predetermined position, operation of said second controller normally effects rheostatic braking of said motor, and mechanical braking means controlled by said second controller.

9. In a motor control system, electric motor acceleration and regenerative braking means for a motor, a master controller for said means for providing power acceleration and regenerative braking control of said motor when said controller is in an "on" position, a second controller separately operable to provide rheostatic braking when said master controller is in an "off" position including a plurality of resistance sections, a braking contactor for controlling the connection of said resistance sections in circuit with said motor and means including a relay having a coil connected across said braking contactor and short circuited by the closing of said braking contactor to control the subsequent shorting out of a portion of said resistance sections from the circuit of the motor, and mechanical braking means controlled by said second controller, said second controller being operable in any of said positions of said master controller for providing mechanical braking during periods of acceleration, during periods of regenerative braking, and during periods of rheostatic braking.

10. In a control system for a motor, a first plurality of resistance sections for connection in series circuit with the motor, means for progressively excluding said resistance sections to accelerate the motor, a shunt field circuit for said motor, a second plurality of resistance sections, means for progressively including said second resistance sections in said shunt field circuit to accelerate said motor and for progressively excluding said second resistance sections from said shunt field circuit for controlling the regenerative braking of said motor, control means including a sequencing controller for controlling said means to effect the connection and exclusion of all of said resistance sections in said circuits, and means operated by said sequencing controller for retaining said first plurality of resistance sections excluded from the motor circuit after said first plurality of resistance sections has once been excluded until said sequencing controller is returned to a predetermined position.

11. In a control system for a motor, a first plurality of resistance sections for connection in series circuit with a motor, means for progressively excluding said resistance sections to accelerate the motor, a shunt field circuit for said motor, a second plurality of resistance sections, means for progressively including said second resistance sections in said shunt field circuit to accelerate said motor and for progressively excluding said second resistance sections from said shunt field circuit for controlling the regenerative braking of the motor, control means including a sequencing controller for controlling said means to effect the connection and exclusion of all of said resistance sections in said circuits, means operated by said sequencing controller for retaining said first plurality of resistance sections excluded from the motor circuit after said first plurality of resistance sections have once been excluded until said sequencing controller is returned to a predetermined position, and rheostatic braking means for said motor including over-voltage relay means responsive to the voltage across the motor circuit for changing over to rheostatic braking when the voltage regenerated during regenerative braking in the motor circuit exceeds a predetermined value and for simultaneously interrupting said retaining means for causing the reinsertion of a portion of said first plurality of resistance sections into the motor circuit.

HAMMOND C. HASTINGS.
FREDERICK F. USHER.